UNITED STATES PATENT OFFICE.

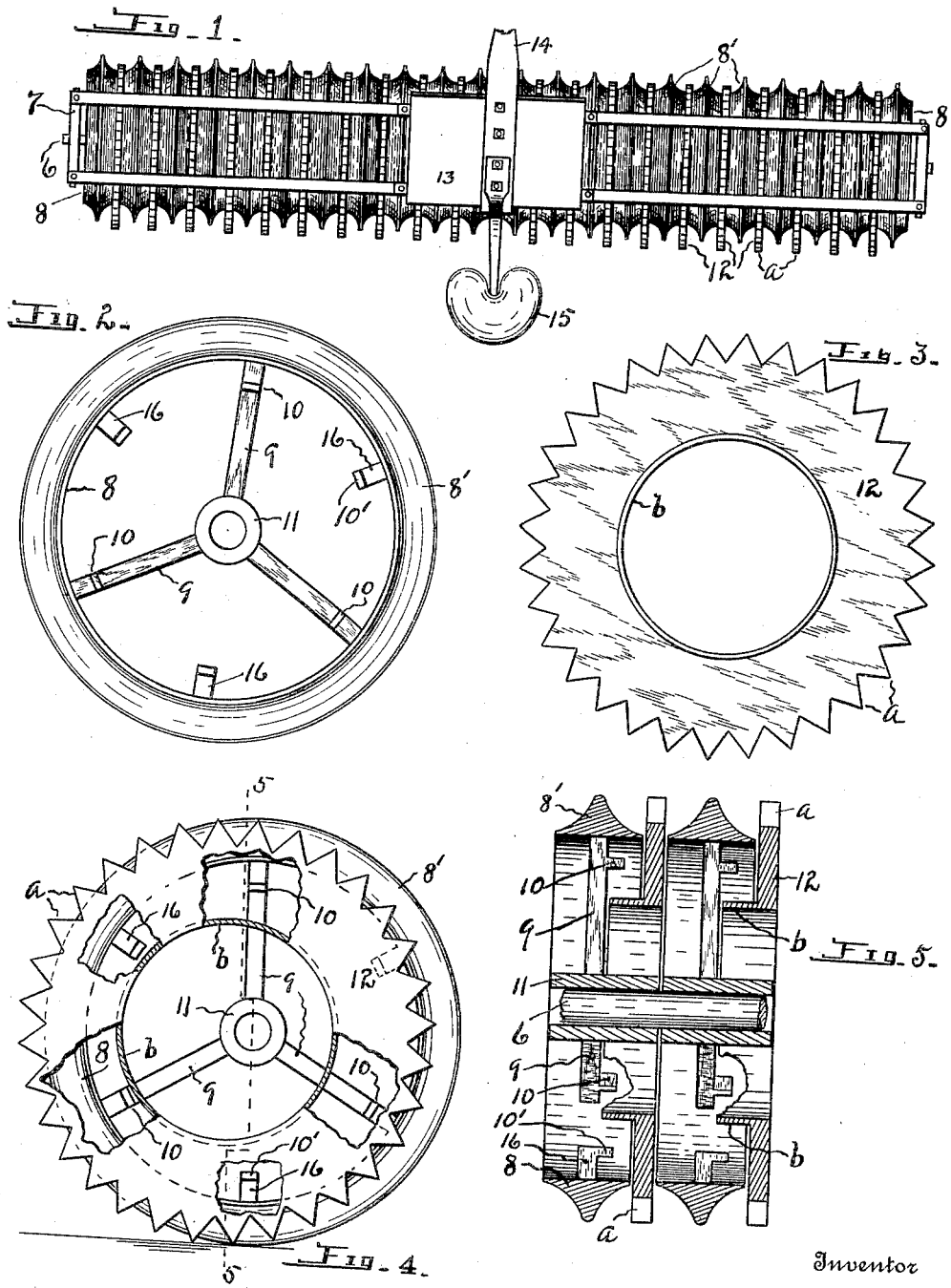

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION.

MULCHING AND PACKING IMPLEMENT.

1,098,757.  Specification of Letters Patent.  Patented June 2, 1914.

Application filed March 2, 1914. Serial No. 821,860.

*To all whom it may concern:*

Be it known that I, LAURITS T. RASMUSSEN, a citizen of the United States, residing at Council Bluffs, in the county of Pottawattamie and State of Iowa, have invented certain new and useful Improvements in Mulching and Packing Implements, of which the following is a specification.

This invention relates to an improvement in mulching and packing implements, of the class adapted to form perforations in the ridges which are formed by the packing wheels.

The principal object of the invention is to provide bearings for the mulching disks upon the packing wheels which will be durable, and will be convenient and economical in manufacture, another object being to provide such a construction that the stresses directed to a packing wheel will be sustained midway between the ends of the hubs thereof, to prevent binding and unequal wear of the hubs on the axle, and to permit the spokes to be located midway between the ends of the wheel to thereby provide a more equal balance for each packing wheel on the axle.

With these objects in view and others to be mentioned hereinafter, the invention presents a novel construction, combination and arrangement of parts as described herein and claimed, and as illustrated in the drawing, wherein—

Figure 1 is a plan view of the implement. Fig. 2 is a side or end view of one of the packing wheels. Fig. 3 is a similar view of a mulching disk. Fig. 4 illustrates a mulching disk, partly broken, and mounted on a packing wheel to show relative position of parts. Fig. 5 is a sectional view on line 5—5 of Fig. 4, an additional packing wheel and mulching disk and an axle also being shown, the flanges of the mulching disks being broken away.

Referring now to the drawing for a more particular description, numeral 6 indicates an axle or shaft having suitable bearings in a frame 7. Upon the shaft are mounted a plurality of packing wheels 8, each having spokes 9 provided with lugs or projections 10 disposed at substantially uniform distances from its hub 11, and provided, intermediate the spokes, with brackets 16 extending inwardly from its tire, the brackets preferably being provided with transverse projections or bearing-lugs 10' disposed at the same radial distance from the hub as lugs 10.

At 12 are indicated annular disks, preferably having the same diameter as the packing wheels, each of said disks being provided with peripheral teeth *a* and a transverse flange *b*. As illustrated in Fig. 1, the mulching or annular disks 12 are disposed between the packing wheels, and as shown in Figs. 4 and 5, the flanges of the mulching disks are disposed intermediate the lugs 10 and 10' and hubs of the packing wheels.

The frame 5 is provided with a platform 13 upon which is supported the tongue and driver's seat, respectively indicated at 14 and 15; and when the implement is moving forwardly, the flanges of the mulching disks will be engaged by the lugs 10 and 10' at the rear part of the packing wheels. The longitudinal axes of the packing wheels will be maintained in alinement since they are rotatably mounted on the shaft, but the axes of the mulching disks will not be disposed in alinement with the shaft, and, normally their longitudinal axes will be disposed rearwardly of the shaft as shown in Fig. 4, for the reason that the distance, radially considered, of the lugs 10 and 10' from the axis of each packing wheel is greater than the distance of an endless flange *b* of a disk 12 from the axis thereof.

The tire of each packing wheel is formed outwardly convergent, as indicated at 8', and by use of the implement, ridges are formed between the packing wheels, and the mulching disks form small pockets or perforations in the ridges. Since the mulching disks are normally disposed rearwardly of the packing wheels, the ridges will be formed forwardly of the rotatable mulching disks.

It will be noted that the construction shows the spokes to be located substantially midway between the edges of the wheel rims, this being a desirable feature, since the rims are thereby more securely supported, and manufacture is more convenient; also the stresses directed to the packing wheels by the mulching disks will be sustained to advantage, since the lugs 10 and 10' which are engaged by the flanges of the mulching disks, are disposed midway between the ends of the hubs, and this tends to prevent binding or unequal pressure of the hubs upon the shaft or axle.

Having fully described the construction, a further explanation relating to operation is not necessary.

What I claim and desire to secure by Letters Patent is,—

1. A mulching and packing implement, comprising a shaft, a plurality of packing wheels rotatably mounted thereon, each having a tire with an outwardly convergent endless ridge, and provided with inwardly extending members provided with bearing-lugs disposed at substantially uniform distances from its axis, a plurality of annular disks each being provided with peripheral teeth and a transverse flange and disposed to circumscribe the shaft intermediate the packing wheels with its flange disposed inwardly of the bearing-lugs of one of said packing wheels.

2. A mulching and packing implement, comprising a shaft, packing wheels mounted to rotate thereon, each being provided with a tire having inwardly projecting members with bearing-lugs, annular disks having peripheral teeth and provided at their inner edges with transverse flanges, each being disposed intermediate two packing wheels, the distance, radially considered, of the flanges from the axes of the annular disks being less than the distance of the bearing-lugs from the axes of said packing wheels.

3. A mulching and packing implement, comprising a shaft, a plurality of packing wheels rotatably mounted thereon, each having a tire with an outwardly convergent endless ridge and provided with spokes having lugs disposed at substantially uniform distances from its axis, a plurality of annular disks each being provided with peripheral teeth and a transverse flange and disposed to circumscribe the shaft intermediate the packing wheels with its flange disposed inwardly of the lugs of one of said packing wheels.

4. A mulching and packing implement, comprising a shaft, packing wheels mounted to rotate thereon, each being provided with transverse projections, annular disks having peripheral teeth and provided at their inner edges with transverse flanges, each being disposed intermediate two packing wheels, the distance, radially considered, of the flanges from the axes of the annular disks being less than the distance of the projections from the axes of said packing wheels.

5. A mulching and packing implement, comprising a shaft, packing wheels mounted to rotate thereon, each being provided with an outwardly convergent tire and having spokes provided with transverse projections disposed in the plane of the tire, annular disks having peripheral teeth and provided with flanges, each disk being disposed adjacent with its flange disposed in the plane of a packing wheel inwardly of the projections thereof, the operation being that when the implement is moving forwardly, the axes of the annular disks will normally be disposed in non-alinement with the axes of the packing wheels.

In testimony whereof, I have affixed my signature in presence of two witnesses.

LAURITS T. RASMUSSEN.

Witnesses:
L. M. THOMAS,
HIRAM A. STURGES.

Copies of this patent may be obtained for five cents each, by addressing the "Commissioner of Patents, Washington, D. C."